United States Patent
Johnson et al.

(10) Patent No.: US 9,989,644 B2
(45) Date of Patent: Jun. 5, 2018

(54) USE OF WIDE AREA REFERENCE RECEIVER NETWORK DATA TO MITIGATE LOCAL AREA ERROR SOURCES

(71) Applicant: Honeywell International Inc., Morris Plains, NJ (US)

(72) Inventors: Bruce G. Johnson, Shoreview, MN (US); James Arthur McDonald, Minneapolis, MN (US); Kim A. Class, Andover, MN (US)

(73) Assignee: Honeywell International Inc., Morris Plains, NJ (US)

( * ) Notice: Subject to any disclaimer, the term of this patent is extended or adjusted under 35 U.S.C. 154(b) by 262 days.

(21) Appl. No.: 15/019,840

(22) Filed: Feb. 9, 2016

(65) Prior Publication Data

US 2017/0227648 A1   Aug. 10, 2017

(51) Int. Cl.
*G01S 19/07* (2010.01)
(52) U.S. Cl.
CPC .................................. *G01S 19/07* (2013.01)
(58) Field of Classification Search
CPC .......... G01S 19/07; G01S 19/20; G01S 19/08; G01S 19/47; G01S 5/009
USPC .................................................... 342/357.44
See application file for complete search history.

(56) References Cited

U.S. PATENT DOCUMENTS

| | | | |
|---|---|---|---|
| 5,323,322 A | 6/1994 | Mueller et al. | |
| 5,621,646 A | 4/1997 | Enge et al. | |
| 5,631,838 A | 5/1997 | Ishikawa et al. | |
| 5,828,336 A | 10/1998 | Yunck et al. | |
| 6,356,232 B1 | 3/2002 | Rocken et al. | |
| 6,407,700 B1 | 6/2002 | Giffard | |

(Continued)

FOREIGN PATENT DOCUMENTS

| | | |
|---|---|---|
| CN | 101839986 | 9/2010 |
| EP | 2784544 | 10/2014 |
| IN | 244673 | 12/2010 |

OTHER PUBLICATIONS

European Patent Office, "Extended European Search Report for EP Application No. 17151490.4", "Foreign counterpart to U.S. Appl. No. 15/003,545", dated Jun. 22, 2017, pp. 111, Published in: EP.

(Continued)

*Primary Examiner* — Harry K Liu
(74) *Attorney, Agent, or Firm* — Fogg & Powers LLC

(57) ABSTRACT

A system to mitigate errors in GPS corrections and ephemeris uncertainty data broadcast to a vehicle is presented. The system includes reference receivers in a first ground subsystem and a processor. The processor: receives, from reference receivers in a wide area network of reference receivers, satellite measurement data for a first plurality of satellites and receives, from the reference receivers in the first ground subsystem, satellite measurement data and ephemeris data from a second plurality of satellites; evaluate the satellite measurement data to determine if the GPS corrections are degraded by a current ionosphere disturbance activity; determine a current quality metric of the ionosphere; adjust a Vertical Ionosphere Gradient standard deviation sigma-vig; evaluate the ephemeris data to determine if the GPS corrections provided to the vehicle are degraded by ephemeris errors; and establish ephemeris uncertainty to protect integrity based on the evaluation of the ephemeris data.

20 Claims, 7 Drawing Sheets

(56) References Cited

U.S. PATENT DOCUMENTS

| | | | |
|---|---|---|---|
| 6,639,549 | B2 | 10/2003 | Vanderwerf et al. |
| 6,781,542 | B2 | 8/2004 | Hoven |
| 6,801,854 | B1 | 10/2004 | Pemble et al. |
| 6,826,476 | B2 | 11/2004 | Ahlbrecht et al. |
| 6,862,526 | B2 | 3/2005 | Robbins |
| 7,117,417 | B2 | 10/2006 | Sharpe et al. |
| 7,256,730 | B2 | 8/2007 | Hernandez-Pajares et al. |
| 7,289,061 | B2 | 10/2007 | Komjathy et al. |
| 7,973,706 | B2 | 7/2011 | Suzuki |
| 8,085,196 | B2 | 12/2011 | Whitehead |
| 8,106,823 | B2 | 1/2012 | Schroth |
| 8,131,463 | B2 | 3/2012 | Lopez et al. |
| 8,203,482 | B2 | 6/2012 | Azaola Saenz |
| 8,305,266 | B2 | 11/2012 | Damidaux et al. |
| 8,344,946 | B2 | 1/2013 | Urn et al. |
| 8,599,065 | B2 | 12/2013 | Rodriguez et al. |
| 8,847,820 | B2 | 9/2014 | Landau et al. |
| 2005/0212696 | A1 | 9/2005 | Bartone et al. |
| 2011/0050492 | A1* | 3/2011 | Um .................. G01S 19/07 342/357.27 |
| 2011/0291887 | A1 | 12/2011 | Pulford |
| 2012/0206298 | A1 | 8/2012 | Alanen et al. |
| 2012/0208557 | A1 | 8/2012 | Carter |
| 2012/0293367 | A1 | 11/2012 | Chen et al. |
| 2014/0062765 | A1 | 3/2014 | Brenner |
| 2014/0163938 | A1 | 6/2014 | Sparks et al. |
| 2014/0285376 | A1 | 9/2014 | Scheitlin |
| 2014/0292573 | A1 | 10/2014 | Drescher et al. |
| 2015/0145722 | A1 | 5/2015 | Johnson et al. |
| 2016/0282470 | A1* | 9/2016 | McDonald ............ G01S 19/05 |
| 2016/0377730 | A1* | 12/2016 | Drescher .............. G01S 19/13 342/357.23 |
| 2017/0212241 | A1 | 7/2017 | McDonald et al. |

OTHER PUBLICATIONS

European Patent Office, "Extended European Search Report for EP Application No. 17151893.9 dated Jun. 28, 2017", "Foreign Counterpart to U.S. Appl. No. 15/019,840", filed Jun. 28, 2017, pp. 112, Published in: EP.

Joerger et al., "Analysis of Iridium-Augmented GPS for Floating Carrier Phase Positioning", "Navigation: Journal of the Institute of Navigation", Sep. 1, 2010, pp. 137-160, vol. 57, No. 2, Publisher: Institute of Navigation, Published in: Fairfax, VA, US.

Pervan et al., "Orbit Ephemeris Monitors for Local Area Differential GPS", "NTM 2008—Proceedings of the 2008 lational Technical Meeting of the Institute of Navigation", Oct. 30, 2008, pp. 359362, Publisher: The Institute of Navigation.

Wikipedia, "Wide Area Augmentation System", "Retrieved from the URL: https://en.wikipedia.org/w/index.php?title=Wide_Area_Augmentation_System&oldid=699233498", Jan. 11, 2016, pp. 1-13.

Walter et al, "The Advantages of Local Monitoring and VHF Data Broadcast for SBAS", "Proceedings of the European Navigation Conference GNSS", Jul. 19-22, 2005, pp. 115, Published in: Munich, Germany.

Wen et al., "Integrating WAAS into LAAS to Improve the Integrity of LAAS", "GNSS 2005—Proceedings of the 18th International Technical Meeting of the Satellite Division of the Institute of Navigation (ION GNSS 2005)", Sep. 16, 2005, pp. 2855-2856, Publisher: The Institute of Navigation.

Circiu et al., "Evaluation of Dual Frequency GMAS Performance using Flight Data", "Proceedings of the ION ITM, 2014"pp. 1-12.

Jung et al., "Long-term ionospheric anomaly monitoring for ground based augmentation systems", "Radio Science", Jul. 25, 2012, pp. 1-26, vol. 47, No. 4, Publisher: retrieved from http://onlinelibrary.wiley.com/doi/10.1029/2012RS005016/full.

Konno, "Dual-Frequency Smoothing for CAT III LAAS: Performance Assessment Considering Ionosphere Anomalies", "Proceedings of the 20th International Technical Meeting of the Satellite Division of the Institute of gavigation (ION GNSS 2007)", 2007, pp. 1-14.

Lee et al., "Assessment of Nominal Ionosphere Spatial Decorrelation for LAAS", "Proceedings of IEEE/ION PLANS 2006", Apr. 27, 2006, pp. 506-514.

Lee et al "Position-Domain Geometry Screening to Maximize LAAS Availability in the Presence of Ionosphere—Anomalies", Jul. 14, 2011, pp. 1-16.

Lee et al., "Position-Domain Geometry Screening to Maximize LAAS Availability in the Presence of Ionosphere Anomalies", "ION GNSS 19th International Technical Meeting of the Satellite Division 2006"pp. 1-16.

Majithiya et al., "Indian Regional Navigation Satellite System", "InsideGNSS, Jan./Feb. 2011"pp. 40-46.

Nomura et al., "GPS Orbit Determination using Several Reference", "SICE Annual Conference", Sep. 17-20, 2007, pp. 1770-1773, Published in: Japan.

Park et al., "Mitigation of Anomalous Ionosphere Threat to Enhance Utility of LAAS Differentially Corrected Jositioning Service (DCPS)", "Proceedings of IEEE/ION PLANS 2008", May 8, 2008, pp. 285-293.

Pullen et al., "The Impact and Mitigation of Ionosphere Anomalies on Ground-Based Augmentation of GNSS", "12th International Ionospheric Effects Symposium (IES 2008), Session 4A, Paper #6", May 14, 2008, pp. 1-24, Publisher: Stanford University.

Pullen et al., "Using SBAS to Enhance GBAS User Availability: Results and Extensions", "Use of External Information in GBAS", Nov. 12, 2010, pp. 1-24, Published in: JP.

Pullen at al., "Using SBAS to Enhance GBAS User Availability: Results and Extensions to Enhance Air Traffic Management (EIWAC 2010)", 2010, pp. 1-11, Publisher: Dept of Aeronautics and Astronautics at Stanford University, Published in: US.

Ramakrishnan et al., "Targeted Ephemeris Decorrelation Parameter Inflation for Improved LAAS Availability during Severe Ionosphere Anomalies", "Proceedings ION NTM 2008", , pp. 1-13.

Rife et al., "WAAS-Based Threat Monitoring for a Local Airport Monitor (LAM) That Supports Category I Precision Approach", Apr. 25-27, 2006, pp. 468-482, Publisher: Illinois Institute of Technology, Published in: US.

Simili et al., "Code-Carrier Divergence Monitoring for the GPS Local Area Augmentation System", "IEEE/ION Position, Location, and Navigation Symposium 2006", 2006, pp. 483-493.

Sunehra, "Real-Time Estimation of Ionospheric Delay Using Dual Frequency GPS Observations", "European Scientific Journal", May 2013, pp. 36-50, vol. 9 15.

Suzuki et al., "Evaluation of Dual-Frequency GBAS Performance using Data from Public Receiver Networks", "Proceedings of the 23rd International Technical Meeting of the SAtellite Division of the Institute of Navigation (ION GNSS 2010)", , pp. 1-11.

Takeyasu et al., "3-1-2 Air Navigation with Global Navigation Satellite Systems and the Ionospheric Effects", "Journal of the National Institute of Information and Communications Technology, 2009", , pp. 231-242, vol. 56, No. 1-4.

\* cited by examiner

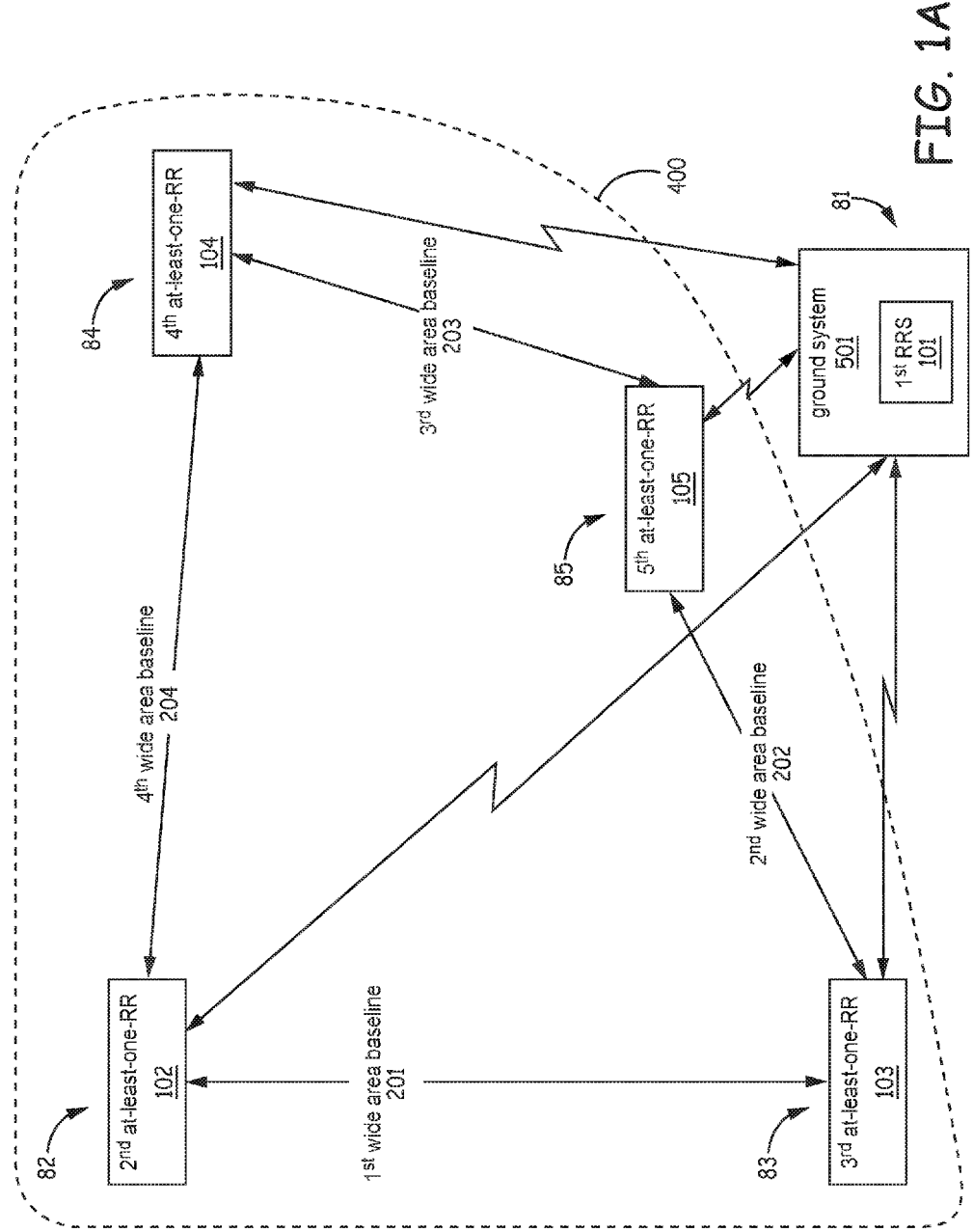

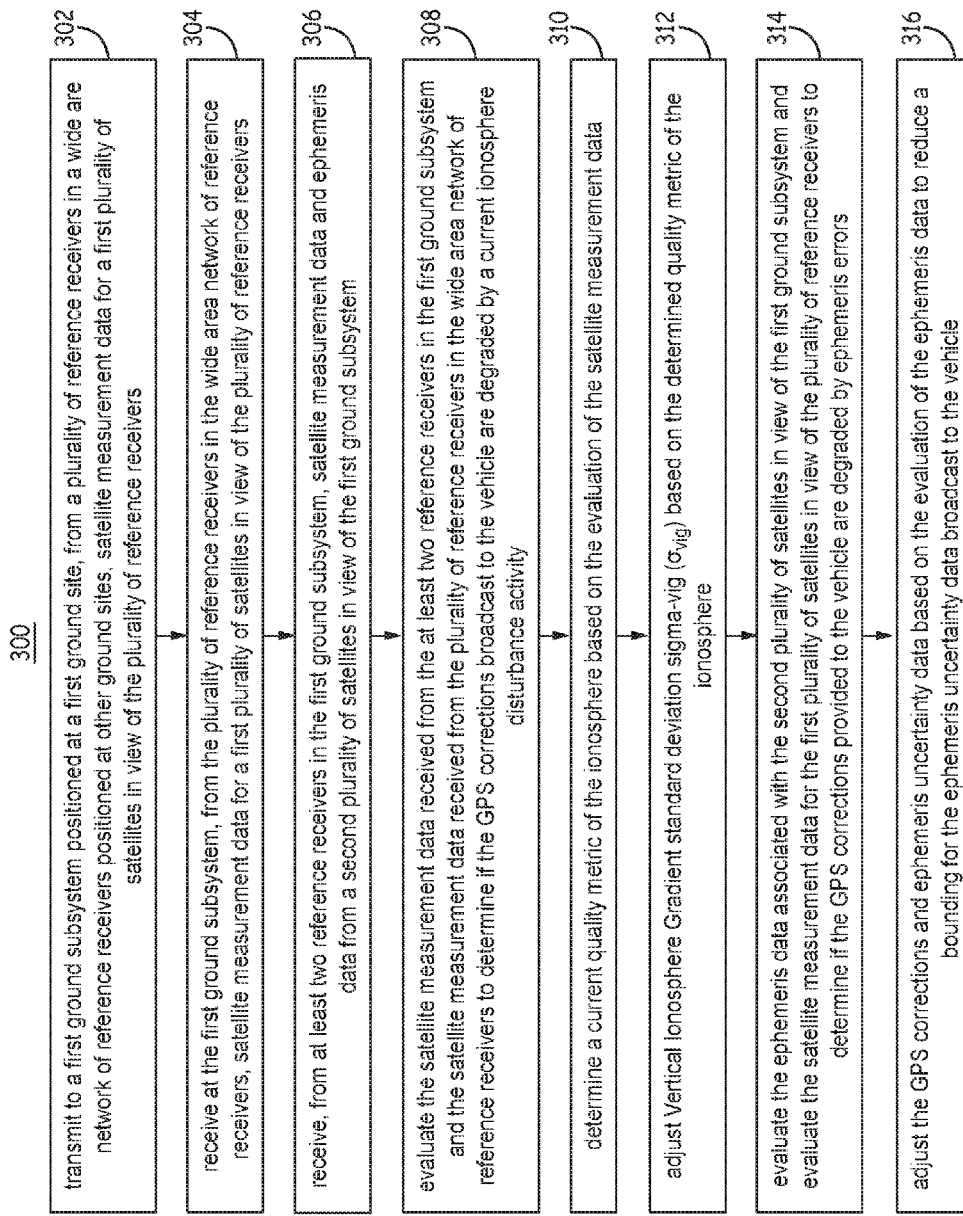

USE OF WIDE AREA REFERENCE RECEIVER NETWORK DATA TO MITIGATE LOCAL AREA ERROR SOURCES

BACKGROUND

Global Navigation Satellite Systems (GNSS) provide aircraft with navigation support in approach and landing operations. However, since the accuracy and precision requirements are high in approach and landing operations, Ground Based Augmentation Systems (GBAS) augment GNSS when an aircraft is near a GBAS Ground Subsystem. The GBAS ground subsystems augment GNSS receivers by broadcasting pseudorange corrections and integrity information to the aircraft. The pseudorange corrections and integrity information are used to remove GNSS errors impacting satellite measurements processed by the aircraft's GNSS receiver. As a result, aircraft can have improved accuracy, continuity, availability, and integrity performance for precision approaches, departure procedures, and terminal area operations.

GBAS ground subsystems are susceptible to spatial decorrelation errors (i.e., ionospheric errors and ephemeris errors) between the ground subsystem providing global positioning system (GPS) corrections and airborne vehicles consuming GPS corrections.

SUMMARY

The present application related to a system to mitigate errors in global position system (GPS) corrections and ephemeris uncertainty data broadcast to a vehicle consuming the GPS corrections and the ephemeris uncertainty data. The system includes at least two reference receivers in a first ground subsystem at a first ground site and at least one processor communicatively coupled to the at least two reference receivers. The at least one processor is configured to: receive, from a plurality of reference receivers in a wide area network of reference receivers positioned at other ground sites, satellite measurement data for a first plurality of satellites in view of the plurality of reference receivers; and receive, from the at least two reference receivers in the first ground subsystem, satellite measurement data and ephemeris data from a second plurality of satellites in view of the first ground subsystem. The first ground site is different from the other ground sites and the second plurality of satellites is a subset of the first plurality of satellites. The at least one processor is also configured to execute algorithms to: evaluate the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity; determine a current quality metric of the ionosphere based on the evaluation of the satellite measurement data; adjust a Vertical Ionosphere Gradient standard deviation sigma-vig ($\sigma_{vig}$) based on the determined quality metric of the ionosphere; evaluate the ephemeris data associated with the second plurality of satellites in view of the first ground subsystem and evaluating the satellite measurement data for the first plurality of satellites in view of the plurality of reference receivers to determine if the GPS corrections provided to the vehicle are degraded by ephemeris errors; and establish ephemeris uncertainty to protect integrity based on the evaluation of the ephemeris data.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1A shows an embodiment of a wide area network of reference receivers communicatively coupled to a ground subsystem in accordance with the present application;

FIG. 3 is a flow diagram of an embodiment of a method of mitigating errors between a ground subsystem broadcasting GPS corrections and ephemeris uncertainty data to a vehicle consuming the GPS corrections in accordance with the present application;

Figure 1B:
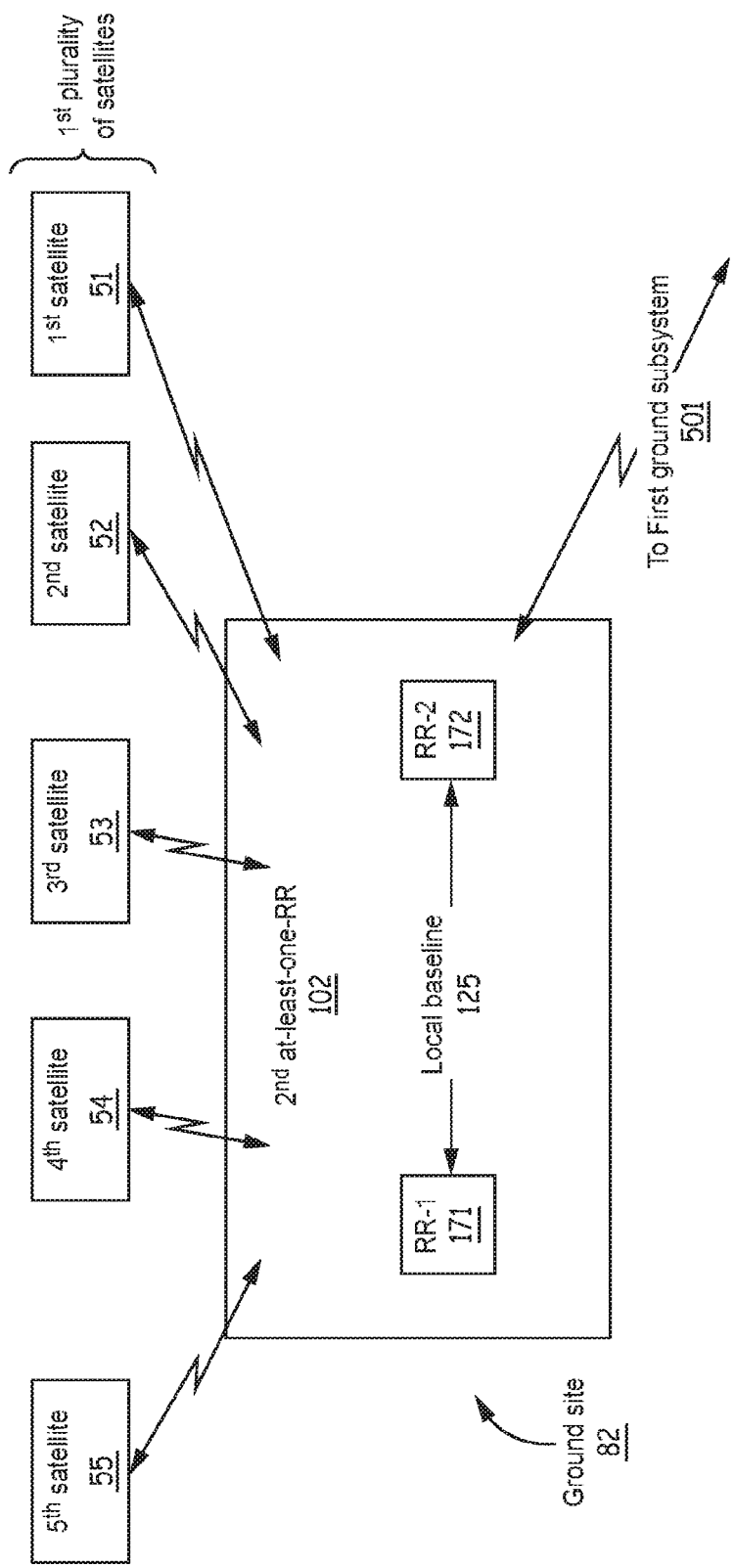
FIG. 1B shows an embodiment of reference receivers in the wide area network of reference receivers in FIG. 1A in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A Global Navigation Satellite System (GNSS), as that term is used herein, refers to a system that utilizes a constellation of orbiting satellite for the purpose of calculating navigation and/or position solutions. Example GNSSs include, but are not limited to, the United States' Global Positioning System (GPS), Russia's Global'naya Navigatsionnaya Sputnikovaya Sisterna (GLONASS), China's Compass, the European Union's Galileo, India's Indian Regional Navigational Satellite System (IRNSS), and Japan's Quasi-Zenith Satellite System (QZSS).

GPS does not provide accuracy integrity levels needed to land an aircraft. GBAS ground stations (also referred to herein as "GBAS ground subsystems", "GBAS subsystem", "ground subsystems", or "ground stations") enable improved accuracy, continuity, availability, and integrity performance for precision approaches, departure procedures, and terminal area operations. Continuity refers to the probability of a system outage occurring in a specified exposure time, and availability refers to how often the system is usable for an extended period of time, for example, over the course of a year. GBAS currently supports CAT1 (200 feet decision height) for aircraft approach operations. GBAS provides very high frequency (VHF) uplinks to provide error correction information to an aircraft (i.e., vehicle) to support applicable operations. The differential range error corrections broadcast by the ground station improve GPS accuracy while ranging sources (i.e., satellites) are monitored to ensure integrity. GBAS installations are generally limited to the property of a single airport.

The two principle spatial decorrelation error sources are those induced by the ionosphere (referred to as a disturbed ionosphere) and those induced by an ephemeris fault. A spatially decorrelated error is an error that increases as the distance between the aircraft and the ground station increases. Over large distances between the ground subsystem and a vehicle, it is possible for the variation in ionospheric delay, caused by a disturbed ionosphere, to result in large range errors which could be prohibitive to precision approach operations. Ground subsystems are susceptible to both types of spatial decorrelation errors between the ground subsystem (providing GPS corrections) and airborne subsystem (consuming GPS corrections) due to a lack of observability by the relatively short local baseline (100's of meters) of the reference receivers in a ground subsystem.

An ionosphere is not healthy when the ionosphere is disturbed by anomalous ionospheric storms, elevated ionospheric activity, ionosphere induced delays, ionospheric gradients, and/or depletion bubbles in the earth's atmosphere. An unhealthy ionosphere is referred to herein as a "disturbed ionosphere", which can causes a loss of availability and impact the continuity of the navigation system.

A disturbed ionosphere introduces delays to GPS signals going to the aircraft and/or introduces delays to GPS signals going to the ground subsystem. If the delays to GPS signals going to the aircraft and delays to GPS signals going to the ground subsystem are different, the resultant differential error needs to be bounded in the GPS corrections broadcast from a GBAS station. GPS corrections include or account for all observed errors.

Under nominal conditions, the difference in the ionospheric delays experienced by the GBAS ground station and the aircraft's GNSS receiver is below a preselected threshold. In such a case, the ionosphere is determined to be healthy. Any small variation in delay in a healthy ionosphere can be accounted for via a simple overbound of Vertical Ionosphere Gradient standard deviation sigma-vig ($\sigma_{vig}$), which is broadcast by the GBAS station being utilized by the airborne user. The overbound is a conservative representation of the error distribution used by the ground station based on the worst possible error that could be present on a GNSS satellite based on information from the satellites in view. Overbounding of the sigma-vig ($\sigma_{vig}$) can be accomplished by increasing the error bounding distance from the aircraft by adding a K factor and/or a sigma multiplier.

If the difference in the ionospheric delays is above a preselected threshold, the ionosphere is not healthy. In this case, more complicated methods of error mitigation are required, including increased inflation of the sigma-vig ($\sigma_{vig}$) or removal of the satellite measurements from the data broadcast from the GBAS station. For example, the sigma-vig ($\sigma_{vig}$) may require increased levels of overbound or the satellite measurements may have to be excluded from the broadcast list of corrections.

Ephemeris error, which is also referred to as a satellite positional error, is a difference between the expected and actual orbital position of a ranging source. If there is an ephemeris error, the difference in the actual satellite position and ephemeris based position could result in unacceptably large errors associated with the GBAS station's broadcast differential corrections. Therefore the GBAS station broadcasts an error bounding for ephemeris errors to the aircraft in the vicinity. Prior art mitigation strategies have included overbounding (also referred to herein as "bounding") of undetectable errors. Bounding the GPS corrections and the airborne position is important when performing precision approaches.

The ephemeris bounding is calculated as follows. The satellites transmit signals at precise times and the GBAS station measures how long it takes the satellite signal to reach the receiver on the ground. The satellites also transmit ephemeris data (i.e., ephermites), which is a very accurate description of the orbital position of the satellite over time. Given the time delay to receive the signal at the GBAS station and the known satellite position in space from the ephemeris data, the distance to satellite is computed.

The ground station provides GPS corrections and separate sigma (i.e., standard deviation) and uncertainty information. The information uplinked to the aircraft is used for bounding error sources to enable the airborne user to compute a protection level bounding. The protection level bounding is compared to an alert limit. If the aircraft exceeds the alert limit, the aircraft does not land but goes around (initiates a go-around and has a missed approach) since the safety may not be met. The protection level is inflated to represent worst case error conditions. Over inflation of the protection level is known to result in a reduction of system availability and loss of continuity (resulting in a missed approach).

Current technology is limited in how well the level of bounding needed to offset for the disturbed ionosphere and/or ephemeris errors is identified because the observables at GBAS station are only available from the local baseline, generally within the airport property boundaries. The local baselines are short (on the order of 100's of meters) and have pierce points in only a relatively small area.

The systems and methods described herein receive and process data from both the ground subsystem at a first ground site and a wide area network of reference receivers at multiple other ground sites. The wide area network of reference receivers has a large number of pierce points over a large area (much larger than the area of the ground subsystem) and a wide area baseline that is much larger than the local baseline of the ground subsystem. The processed data is used in the ground subsystem to mitigate the local area impact of error sources observable by the wide area network. The satellite measurement data from the multiple ground sites is used to determine a current quality metric of the ionosphere.

The wide area network data include either single frequency satellite measurement data from single-frequency satellites and/or dual-frequency-satellite measurement data from dual-frequency satellites. Currently available GBAS stations receive single frequency satellite measurement data from single-frequency satellites, but the technology trend is toward developing GBAS stations designed to receive dual frequency satellite measurement data from dual-frequency satellites. The wide area networks described for implementation herein can receive dual frequency satellite measurement data from dual-frequency satellites or can receive single frequency satellite measurement data from single-frequency satellites. The technology described herein can be extended to more than two frequencies for multi-frequency satellites when they are developed in the future, as is understandable to one skilled in the art upon reading and understanding this document.

FIG. 1A shows an embodiment of a wide area network 400 of reference receivers 102-105 communicatively coupled to a ground subsystem 501 in accordance with the present application. The ground subsystem 501 is at a first ground site. The plurality of reference receivers 102-105 are positioned at the other ground sites 82-85. The first ground site 81 is different from the other ground sites 82-85. The plurality of reference receivers 102-105 (at each of the respective plurality of ground sites 82-85) each includes one or more reference receiver. In FIG. 1A, the plurality of reference receivers 102-105 are represented generally as second at-least-one-reference receiver (RR) 102, third at-least-one-reference receiver 103, fourth at-least-one-reference receiver 104, and fifth at-least-one-reference receiver 105.

The second at-least-one-reference receiver 102, third at-least-one-reference receiver 103, fourth at-least-one-reference receiver 104, and fifth at-least-one-reference receiver 105 are separated from each other by wide area baselines represented generally at 201-204. As shown in FIG. 1A, the second at-least-one-reference receiver 102 is separated from the third at-least-one-reference receiver 103 by a first wide area baseline 201. The third at-least-one-reference receiver 103 is separated from the fifth at-least-one-reference receiver 105 by a second wide area baseline 202. The fifth at-least-one-reference receiver 105 is separated from fourth at-least-one-reference receiver 104 by a third wide area baseline 201. The fourth at-least-one-reference receiver 104 is separated from second at-least-one-reference receiver 102 by a fourth wide area baseline 201. The wide area baseline between the second at-least-one-reference receiver 102 and the fifth at-least-one-reference receiver 105 is not shown for ease of viewing FIG. 1A. Likewise, the wide area baseline between the third at-least-one-reference receiver 103 and the fourth at-least-one-reference receiver 104 is not shown for ease of viewing FIG. 1A. In one implementation of this embodiment, wide area network 400 of a plurality of reference receivers 102-105 is the Continuously Operating Reference Stations (CORS) 400, which is managed under the National Oceanic and Atmospheric Administration (NOAA) in the United States. CORS 400 is a dual-frequency network.

Figure 2:
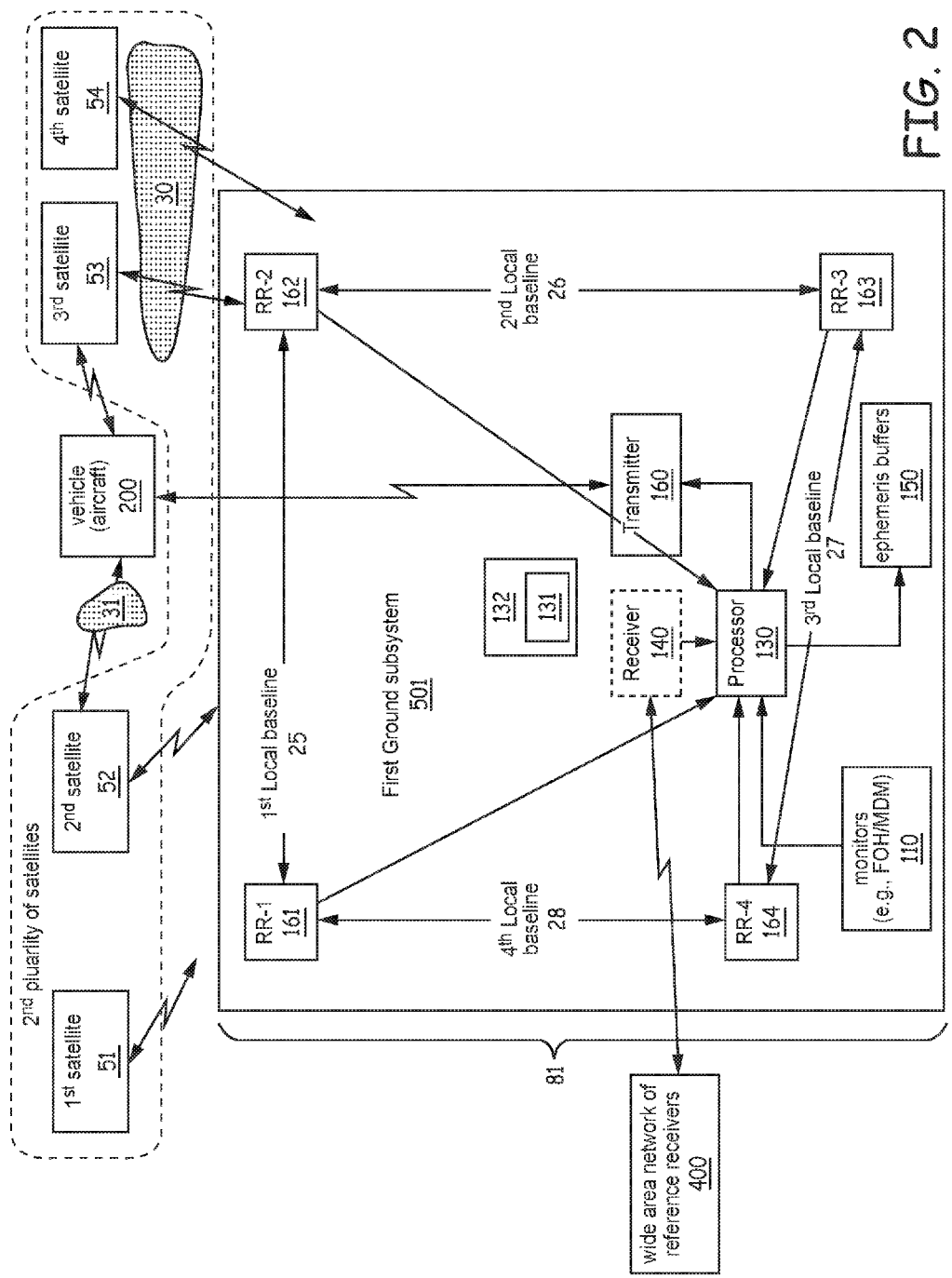
FIG. 2 shows an embodiment of the ground subsystem of FIG. 1A in accordance with the present application.

FIG. 1B shows an embodiment of reference receivers 102 in the wide area network 400 of reference receivers 102-105 in FIG. 1A in accordance with the present application. The exemplary ground subsystem 501 of FIG. 2 is shown in view a first plurality of satellites 51-55. The second at-least-one-reference receiver 102 is positioned at ground site 82 and includes a first reference receiver 171 and a second reference receiver 172 that are separated from each other by a local baseline 125. The first reference receiver 171 and the second reference receiver 172 are configured to receive and process either dual-frequency satellite measurement data or single-frequency satellite measurement data for the plurality of satellites 51-55 that are in view of the first reference receiver 171 and the second reference receiver 172. The dual-frequency or single-frequency satellite measurement data is referred to herein as satellite measurement data. The first reference receiver 171 and/or the second reference receiver 172 transmit the satellite measurement data to the first ground subsystem 501.

In one implementation of this embodiment, the ground site 82 is a geographic location (i.e., latitude and longitude) of the first reference receiver 171 or the second reference receiver 172. In another implementation of this embodiment, the ground site 82 is a geographic location (i.e., latitude and longitude) of a point on the local baseline 125. In yet another implementation of this embodiment, the ground site 82 is a two-by-two matrix that includes the latitude and longitude of the first reference receiver 171 and the latitude and longitude of the second reference receiver 172.

The third at-least-one-reference receiver 103, fourth at-least-one-reference receiver 104, and fifth at-least-one-reference receiver 105 each function in the same manner as the second at-least-one-reference receiver (RR) 102. If one of the third at-least-one-reference receiver 103, fourth at-least-one-reference receiver 104, and fifth at-least-one-reference receiver 105 includes only one reference receiver, then the ground site for that reference receiver is the latitude and longitude of that single reference receiver. If one of the third at-least-one-reference receiver 103, fourth at-least-one-reference receiver 104, and fifth at-least-one-reference receiver 105 includes four reference receivers, then the ground site for that reference receiver is one of: the latitude and longitude of one of the four reference receivers; a latitude and longitude of the geographical region spanned by the four reference receivers; or a two-by-four matrix that includes the latitude and longitude of each of the four reference receivers.

In one implementation of this embodiment, one or more of the second at-least-one-reference receiver (RR) 102, third at-least-one-reference receiver 103, fourth at-least-one-reference receiver 104, and fifth at-least-one-reference receiver 105 includes more than four reference receivers. In another implementation of this embodiment, one or more of the second at-least-one-reference receiver (RR) 102, third at-least-one-reference receiver 103, fourth at-least-one-reference receiver 104, and fifth at-least-one-reference receiver 105 are in a ground subsystem. This latter embodiment is described below with reference to FIGS. 4A and 4B.

The local baseline 125 (FIG. 1B) is much shorter in length than any of the wide area baselines 201-204 (FIG. 1A). In one implementation of this embodiment, the local baseline 125 is on the order of hundreds of meters. In another implementation of this embodiment, the wide area baselines 201-204 are on the order of tens of kilometers. In yet another implementation of this embodiment, the local baseline 125 is less than a hundred meters. In yet another implementation of this embodiment, the wide area baselines 201-204 are on the order of hundreds of kilometers.

FIG. 2 shows an embodiment of the ground subsystem 501 of FIG. 1A in accordance with the present application. The first ground subsystem 501 shown in FIG. 2 is positioned at a first ground site 81 and includes first reference receivers (RRs) 161-164. The exemplary ground subsystem 501 of FIG. 2 is shown in view a second plurality of satellites 51-54 and a vehicle 200 (aircraft 200). The second plurality of satellites 51-54 (FIG. 2) is a subset of the first plurality of satellites 51-55 (FIG. 1B). FIG. 2 also shows exemplary disturbed ionosphere activity represented generally at 30 and 31. A satellite 51, 52, 53, or 54 that is negatively impacted by a current disturbed ionosphere activity 30 or 31 is referred to as a faulty satellite. Thus, as shown in FIG. 2, the second satellite 52, which is shown to be negatively impacted by the exemplary current disturbed ionosphere activity 31, is a faulty satellite. Likewise, the third satellite 53 and fourth satellite 54, which are shown to be negatively impacted by the exemplary current disturbed ionosphere activity 30, are faulty satellites.

The first ground subsystem 501 includes at least two reference receivers 161-164, at least one processor 130, monitors 110, and ephemeris buffers 150. The data from local reference receivers 161-164 is fed directly to the processor 130. The first ground subsystem 501 includes a transmitter 160 and optionally includes a receiver 140. When a receiver 140 is included in the first ground subsystem 501, the receiver 140 functions to compile the wide area data input to the GBAS station 501 from the wide area network 400. The compiled data is then fed to the processor 130. In one implementation of this embodiment, the receiver 140 is a modem 140.

In one implementation of this embodiment, when the receiver 140 is not included in the first ground subsystem 501, the wide area network 400 functions to compile (e.g., preprocess) the data, which is sent to the processor 130. In another implementation of this embodiment, when the receiver 140 is not included in the first ground subsystem 501, processor 130 functions to compile the data received from the wide area network 400.

In one implementation of this embodiment, the monitors 110 include a first order hold (FOH) and at least one maneuver detector monitor (MDM). Currently available FOH and MDM utilize stored ephemeris data as part of their real-time monitoring capability and are tripped (i.e., triggered) when ephemeris data for a particular satellite is bad (faulty). When this occurs, the data saved for the faulty satellite in an ephemeris buffer 150 is eliminated and all data from this satellite are excluded from the pseudorange correction data. In another implementation of this embodiment, the ephemeris buffers 150 store twenty-four hours of ephemeris data for the satellites in the GNSS that includes the plurality of satellites in view of the first ground subsystem 501. In yet another implementation of this embodiment, the ephemeris buffers 150 store forty-eight hours of ephemeris data for the satellites in the GNSS that includes the plurality of satellites in view of the first ground subsystem 501. In yet another implementation of this embodiment, the ephemeris buffers 150 store more than forty-eight hours of data for the satellites in the GNSS that includes the plurality of satellites in view of the first ground subsystem 501. The at least one processor 130 is also referred to herein as processor 130.

FIG. 3 is a flow diagram of an embodiment of a method 300 of mitigating errors between a ground subsystem 501 broadcasting GPS corrections and ephemeris uncertainty data to a vehicle 200 (such as aircraft 200) consuming the GPS corrections in accordance with the present application. The processes of method 300 are described with reference to FIGS. 1A, 1B, and 2.

At block 302, satellite measurement data for a first plurality of satellites 51-55 (FIG. 1B) in view of the plurality of reference receivers 102-105 positioned at other ground sites 82-85 is transmitted to a first ground subsystem 501 positioned at a first ground site 81 from the plurality of reference receivers 102-105 in the wide area network 400 of reference receivers 102-105. The other ground sites 82-85 are different from the first ground site 81.

At block 304, the satellite measurement data for a first plurality of satellites 51-55 in view of the plurality of reference receivers 102-105 is received at the first ground subsystem 501 positioned at the first ground site 81, from the plurality of reference receivers 102-105 in the wide area network 400 positioned at the other ground sites 82-85.

In one implementation of this embodiment, the data from the first plurality of satellites 51-55 in view of the wide area network 400 of reference receivers 102-105 is dual-frequency-satellite measurement data from dual-frequency satellites 51-55. In another implementation of this embodiment, the data from the first plurality of satellites 51-55 in view of the wide area network 400 of reference receivers 102-105 is single-frequency-satellite measurement data from single-frequency satellites 51-55. In yet another implementation of this embodiment, the data from the first plurality of satellites 51-55 in view of the wide area network 400 of reference receivers 102-105 includes both dual-frequency-satellite measurement data from dual-frequency satellites and single-frequency-satellite measurement data from single-frequency satellites.

If the wide area network 400 of reference receivers is a CORS network, the received satellite measurement data is dual-frequency-satellite measurement data. In another implementation of this embodiment, if the wide area network 400 of reference receivers is a network of conventional ground systems, the received satellite measurement data is single-frequency-satellite measurement data. Future developed ground systems may include the capability of receiving data from dual-frequency satellites. In that case, the received satellite measurement data is either: 1) single-frequency-satellite measurement data; or 2) a combination of single-frequency-satellite measurement data from single-frequency satellites and dual-frequency-satellite measurement data from dual-frequency satellites.

It is to be noted that the reference receivers 102-105 in wide area network 400 of are in view of all the second plurality of satellites 51-54 that are in view of the first ground site 81 and also includes other satellites (e.g. fifth satellite 55 shown in FIG. 1B) that are not in view of the first ground site 81. Since the second plurality of satellites 51-54 are local to the first ground subsystem 501, the second plurality of satellites 51-54 are also referred to herein as "local satellites 51-54".

At block 306, satellite measurement data and ephemeris data is received from the second plurality of satellites 51-54 in view of the first ground subsystem 501, from at least two reference receivers 161-164 (FIG. 2) in the first ground subsystem 501. The received satellite measurement data can be either single-frequency-satellite measurement data and/or dual-frequency-satellite measurement data.

At block 308, the satellite measurement data received at the processor 130 from the at least two reference receivers 161-164 in the first ground subsystem 501 and the satellite measurement data received at the processor 130 from the plurality of reference receivers 102-105 in the wide area network 400 of reference receivers is evaluated by the processor 130 to determine if the GPS corrections broadcast to the vehicle 200 are degraded by a current ionosphere disturbance activity (such as current disturbed ionosphere activity 30 or 31).

At block 310, a current quality metric of the ionosphere is determined by the processor 130 based on the evaluation of the satellite measurement data at block 308. The wide area network 400 is better at observing disturbed ionosphere at the local reference receivers 161-164 in the ground subsystem 501 since the local reference receivers 161-164 in the ground subsystem 501 have a limited number of pierce points over a small viewable region. The wide area network 400 has many more receivers and pierce points. The processor 130 does not determine which of the local satellites 51-54 in view of the first ground system 501 is impacted by a gradient, but rather the processor 130 determines that a disturbed ionosphere that could impact the local environment that exists at the first ground site 81. The disturbance to the ionosphere is used to develop a quality metric to bound the potential differential error.

The processor 130 determines the total electron count (TEC) in the ionosphere along the satellite's line of sight. The point at which the satellite's line of sight from a respective ground system reference receiver intersects with the ionosphere is the pierce point for the particular satellite. The TEC is proportional to the delay experienced by the signal due to the disruption in the ionosphere. Under nominal conditions, the transmission time delay due to the TEC on satellite signals ranges from a few meters to 10 meters. However, during severe ionosphere storms, this delay can reach up to more than 100 meters. In some implementations, this TEC can be quantified by the processor 130 from the measurements by a linear combination of the measured pseudorange and phase observations registered by the reference receivers 161-164 and 102-105 at the one or more carrier frequencies. Using the TEC, the processor 130 determines the quality of the ionosphere ranging from quiet to storm. The TEC value determines the ionosphere quality metric at the pierce point. The ionosphere at the pierce point is determined to be healthy when the current quality metric of the ionosphere meets a threshold.

If the wide area network 400 of reference receivers 102-105 inputs data from dual-frequency satellites, the current quality metric of the ionosphere is further improved since the wide area network 400 has dual frequency reference receivers 102-105 that directly measure iono delay. Thus, dual frequency provides a more accurate quality metric.

If the wide area network 400 of reference receivers inputs data from single-frequency satellites, the quality metric is less accurate than if a wide area network 400 has dual frequency reference receivers 102-105.

At block 312, a Vertical Ionosphere Gradient standard deviation sigma-vig ($\sigma_{vig}$) is adjusted by the processor 130 based on the determined quality metric of the ionosphere. If the quality metric of the ionosphere has been met (i.e., is less than the preselected threshold), the satellite measurement data is used for computation of differential corrections and a simple technique of overbounding is used for mitigation of the spatial ionosphere decorrelation error. These differential corrections are generated using the location of the local references receivers 161-164. The average error measured by all operational reference receivers is the correction term that can be processed by the vehicle's (e.g., the aircraft's) GNSS receiver to compensate for the delay in signal along the aircraft's line of sight. The ground system 501 processes signals from each of the second plurality of satellites 51-54 in view to compile the list of broadcast corrections to be utilized by the vehicle 200.

After determining that the satellite measurement can be used as part of the broadcast corrections, the corresponding overbound Vertical Ionosphere Gradient standard deviation sigma-vig ($\sigma_{vig}$) for the spatial ionosphere decorrelation error is adjusted. The ground system 501 then processes the information received by the GNSS reference receivers 104 from one or more other multi-frequency satellites observable by the ground system 501 to determine the health of the ionosphere at pierce points of the satellites 51-54 and defines valid iono regions (VIR) of the sky where the same sigma overbound value is applicable. In some examples, the bound of the VIRs are defined based on the quality metric. Thus, if the ionosphere is healthy the VIR could be defined by 50 nautical miles as opposed to a bound of 25 nautical miles if the ionosphere is not as healthy. The bounds of the valid iono region can be even smaller if the health of the ionosphere is more severe.

In this manner, the bounding for the GPS corrections broadcast to the vehicle 200 is reduced. The processor 130 executes algorithms 131 in storage medium 132 (FIG. 2) to identify the level of iono disturbances present and bound for their potential impact.

At block 314, the processor 130 evaluates the ephemeris data associated with the second plurality of satellites 51-54 in view of the first ground subsystem 501 and evaluates the satellite measurement data for the first plurality of satellites 51-55 in view wide area network 400 of reference receivers 102-105 to determine if the GPS corrections provided to the vehicle are degraded by ephemeris errors.

At block 316, the GPS corrections and ephemeris uncertainty data are adjusted based on the evaluation of the ephemeris data to reduce a bounding for the ephemeris uncertainty data broadcast to the vehicle 200.

The processor 130 determines if the ephemeris uncertainty for one or more of the second plurality of satellites 51-54 in view of the first ground subsystem 501 exceeds a preselected threshold. If the ephemeris uncertainty for one or more of the satellites 51, 52, 53, or 54 in view of the first ground subsystem 501 exceeds the preselected threshold, the processor 130 ceases broadcasting the correction data for the effected satellite 51, 52, 53, or 54 (i.e., the satellite that has an ephemeris uncertainty that exceeds the preselected threshold). If the ephemeris uncertainty for a satellite 51, 52, 53, or 54 in view of the first ground subsystem 501 is less than the preselected threshold, the processor 130 broadcasts the adjusted Vertical Ionosphere Gradient standard deviation sigma-vig ($\sigma_{vig}$) and the ephemeris uncertainty from the first ground subsystem 501. In one implementation of this embodiment, the adjusted Vertical Ionosphere Gradient standard deviation sigma-vig ($\sigma_{vig}$) and the ephemeris uncertainty are broadcast by the transmitter 160 (FIG. 2).

Figure 4A:
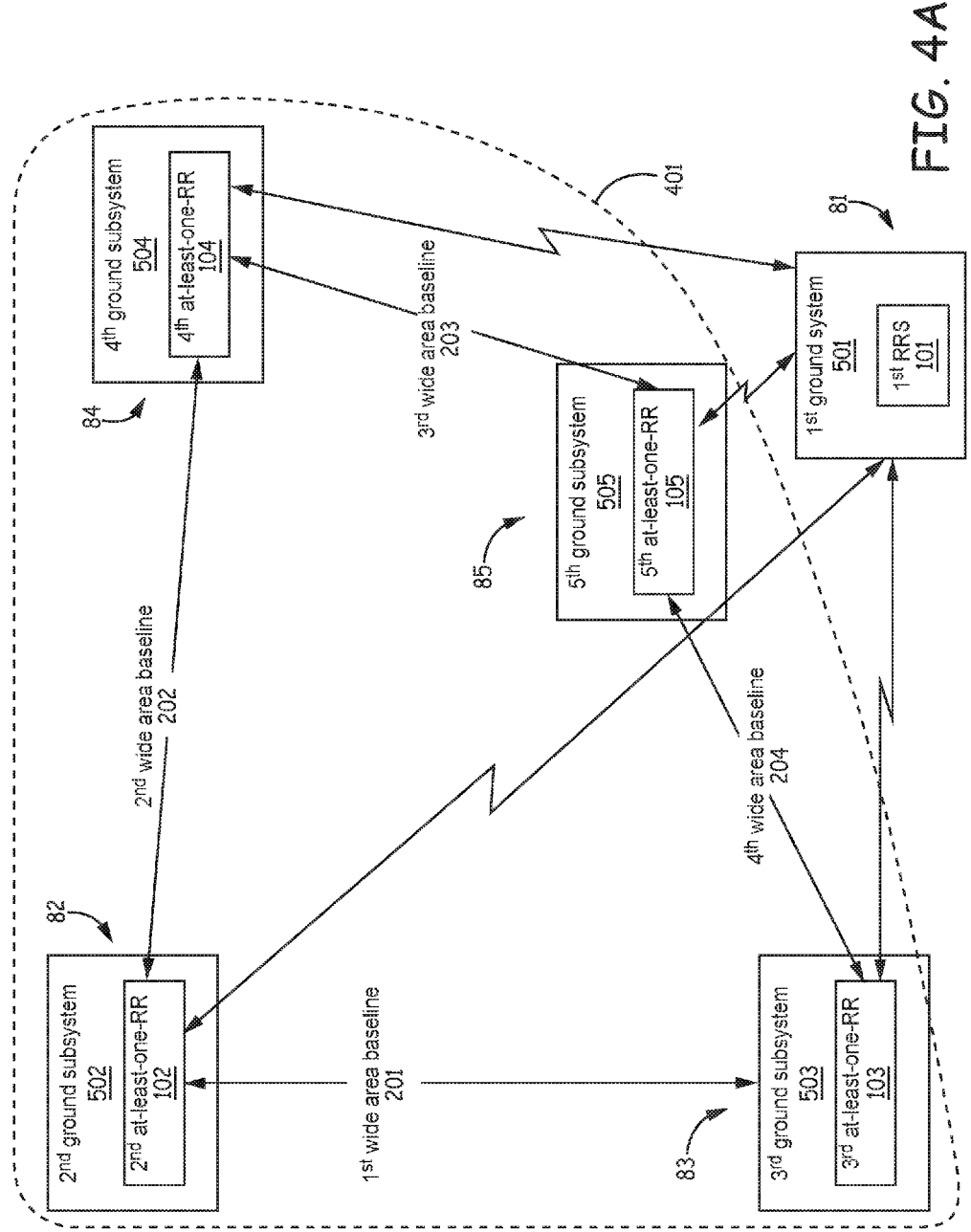
FIG. 4A shows an embodiment of a wide area network of reference receivers in ground subsystems communicatively coupled to a first ground subsystem in accordance with the present application.

FIG. 4A shows an embodiment of a wide area network 401 of reference receivers 102-105 in ground subsystems 502-505 communicatively coupled to a first ground subsystem 501 in accordance with the present application. In the this embodiment, the second at-least-one-reference receiver (RR) 102, third at-least-one-reference receiver 103, fourth at-least-one-reference receiver 104, and fifth at-least-one-reference receiver 105 are each in a respective second ground subsystem 502, third ground subsystem 503, fourth ground subsystem 504, and fifth ground subsystem 505. Each of the ground subsystems 502, 503, 504, and 505 includes at least two reference receivers in a configuration similar to the configuration of the reference receivers 161-164 in the first ground subsystem 501 (FIG. 2).

Figure 4B:
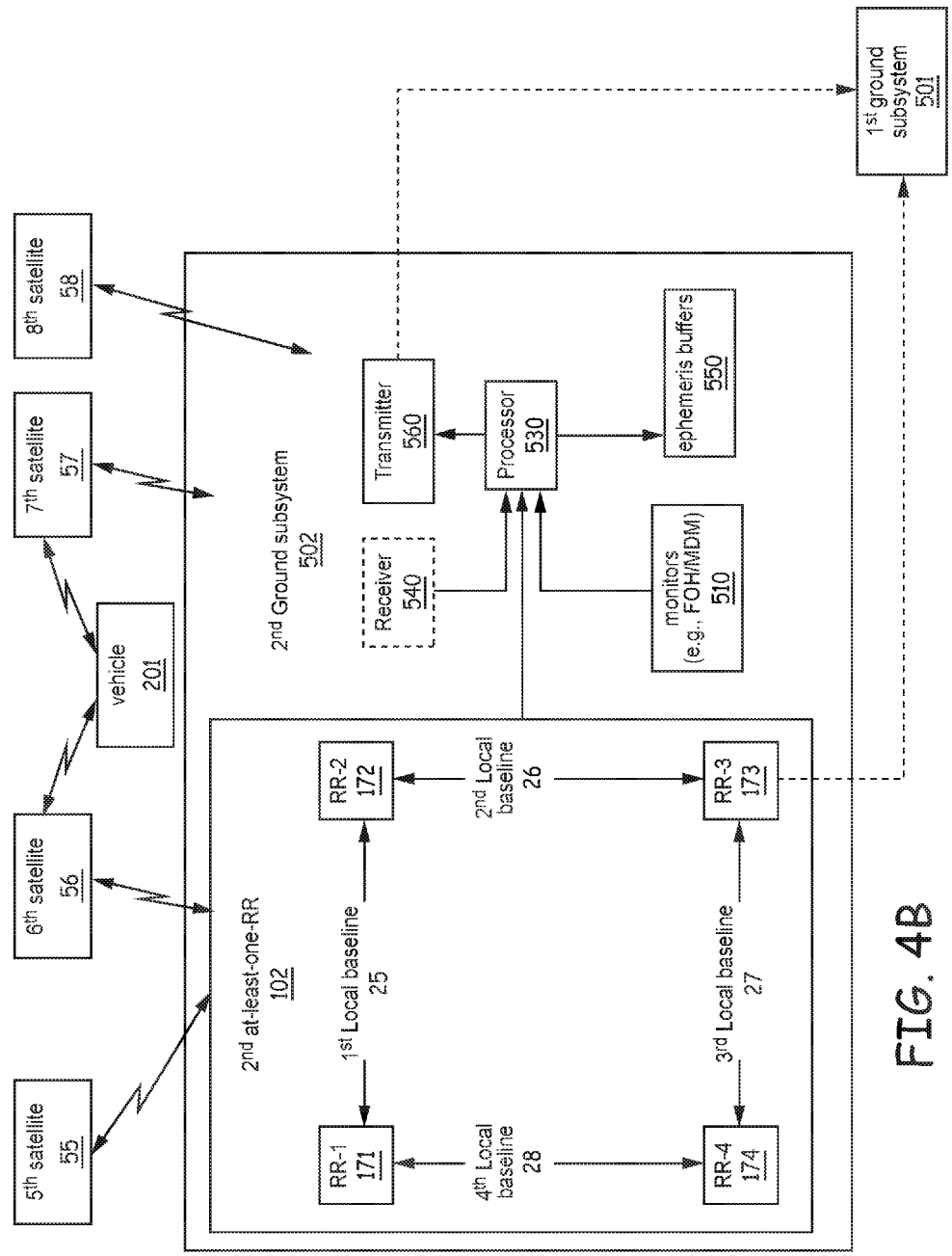
FIG. 4B shows an embodiment of a second ground subsystem of FIG. 4A in accordance with the present application.

FIG. 4B shows an embodiment of a second ground subsystem 502 of FIG. 4A in accordance with the present application. As shown in FIG. 4B, the second ground subsystem 502 includes at least two reference receivers 171-174, at least one processor 530, monitors 510, ephemeris buffers 550, and a transmitter 560. The second ground subsystem 502 optionally includes a receiver 540. The monitors 510, ephemeris buffers 550, receiver 540 and transmitter 560 have a similar structure and function as the monitors 510, and ephemeris buffers 550 described above with reference to FIG. 2. In one implementation of this embodiment, in which the second ground subsystem 502 does not include a transmitter 560, at least one of the reference receivers 171-174 in the second at-least-one-reference receiver 102 sends the satellite measurement data for the plurality of satellites (e.g., exemplary fifth satellite 55, sixth satellite 56, seventh satellite 57, and eighth satellite 58) in view of the set of four reference receivers 171-174 to the first ground subsystem 501.

The third ground subsystem 503, fourth ground subsystem 504, and fifth ground subsystem 505 are similar in structure and function to the second ground subsystem 502.

In one implementation of this embodiment, the first ground subsystem 501 is part of the wide area network 402 with the second ground subsystem 502, the third ground subsystem 503, the fourth ground subsystem 504, and the fifth ground subsystem 505.

Figure 5:
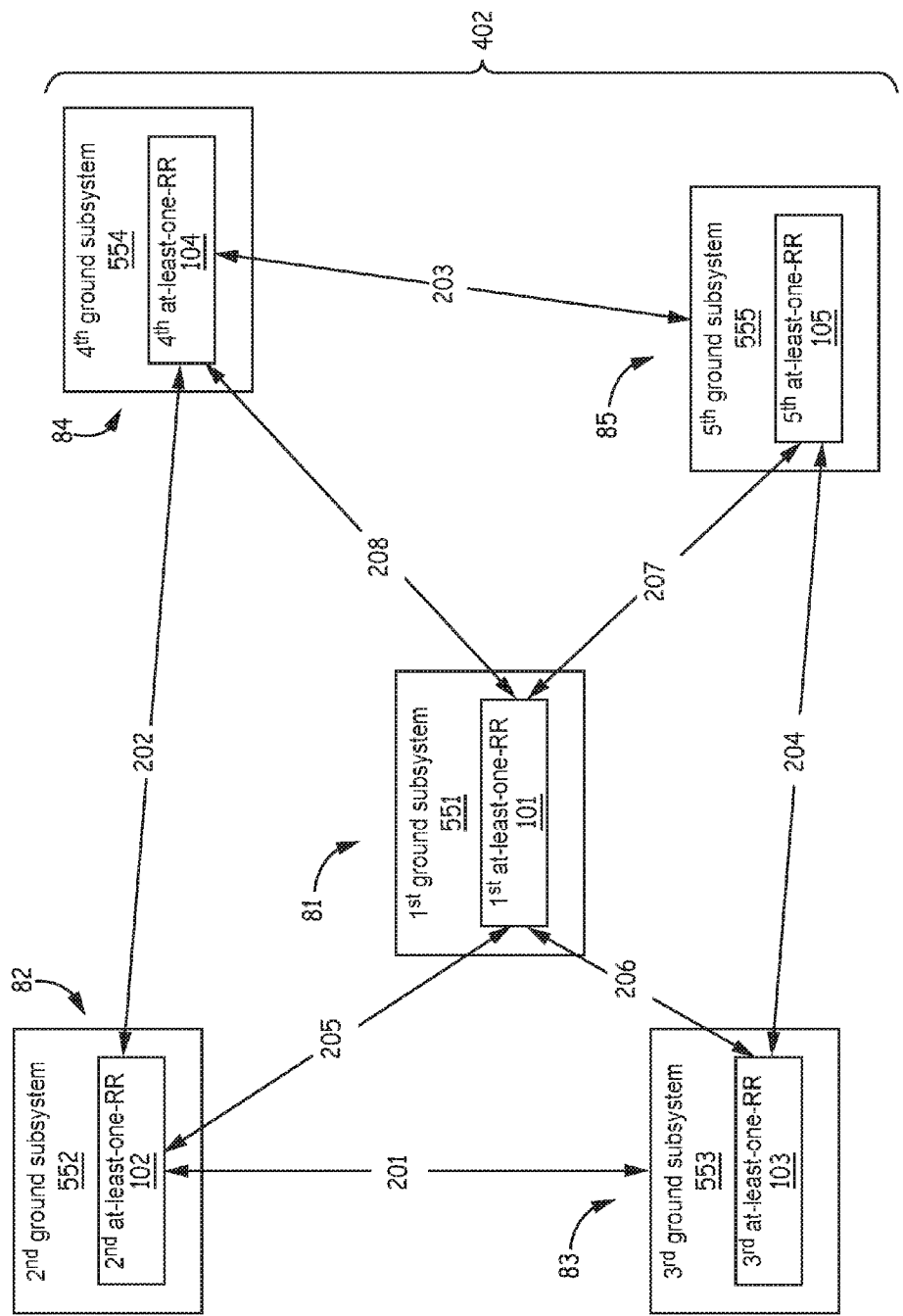
FIG. 5 shows an embodiment of a wide area network of reference receivers in respective ground subsystem communicatively coupled to each other in accordance with the present application.

FIG. 5 shows an embodiment of a wide area network 402 of reference receivers 102-105 in respective ground subsystems 551, 522, 553, 554, 555 communicatively coupled to each other in accordance with the present application. In this embodiment, the first ground subsystem 551, the second ground subsystem 552, the third ground subsystem 553, the fourth ground subsystem 554, and the fifth ground subsystem 555 are at different ground sites 81-85 that are separated from each other by wide area baselines 201-208. The first ground subsystem 551, the second ground subsystem 552, the third ground subsystem 553, the fourth ground subsystem 554, and the fifth ground subsystem 555 are communicatively coupled to each other to transmit satellite measurement data for the satellites in view of the respective ground subsystem. In one implementation of this embodiment, this data is transmitted between pairs of the plurality of ground subsystems 551, 522, 553, 554, 555.

For example, the third ground subsystem 553 transmits satellite measurement data for the satellites in view of the third ground subsystem 553 to each of the first ground subsystem 551, the second ground subsystem 552, the fourth ground subsystem 554, and the fifth ground subsystem 555. At the same time, the third ground subsystem 553 receives dual-frequency-satellite measurement data and ephemeris data for the satellites in view of the first ground subsystem 551, the second ground subsystem 552, the fourth ground subsystem 554, and the fifth ground subsystem 555 from the first ground subsystem 551, the second ground subsystem 552, the fourth ground subsystem 554, and the fifth ground subsystem 555.

The at least one processor 130 and/or 530 includes or functions with software programs, firmware or other computer readable instructions for carrying out various methods, process tasks, calculations, and control functions, used in the respective ground subsystem to mitigate errors in global position system (GPS) corrections and ephemeris uncertainty data broadcast to a vehicle 200 consuming the GPS corrections and the ephemeris uncertainty data. These instructions are typically stored on any appropriate computer readable medium used for storage of computer readable instructions or data structures (e.g., storage medium 132 in FIG. 2). The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The systems and methods described use a wide area network of reference receivers data to mitigate local area error sources to overcome the lack of observability by the relatively short local baseline (100's of meters) of the single frequency reference receivers in ground subsystems. The wide area networks 400, 401, and 402, which have wide area baselines between reference receivers (e.g., at-least-one-reference receivers 102-105), provide additional range and ephemeris data that are communicatively coupled to a ground subsystem 501 to permit detection of ionospheric errors due to current disturbed ionosphere activity and ephemeris errors that could negatively impact the first ground subsystem 501. The processor 130 in the ground subsystem 105 can offset the error and improving the bounding of errors or, if necessary, cease broadcasting of the GPS corrections and the ephemeris uncertainty data for a faulty satellite in view of the first ground subsystem 501. In this manner, GBAS ground subsystems are less susceptible to spatial decorrelation errors (i.e., ionospheric errors and ephemeris errors) between the ground subsystem (providing global positioning system (GPS) corrections) and airborne vehicles (consuming GPS corrections) and have better bounding of the GPS errors and the ephemeris errors.

Example Embodiments

Example 1 includes a system to mitigate errors in global position system (GPS) corrections and ephemeris uncertainty data broadcast to a vehicle consuming the GPS corrections and the ephemeris uncertainty data, the system comprising: at least two reference receivers in a first ground subsystem at a first ground site; at least one processor communicatively coupled to the at least two reference receivers, the at least one processor configured to: receive, from a plurality of reference receivers in a wide area network of reference receivers positioned at other ground sites, satellite measurement data for a first plurality of satellites in view of the plurality of reference receivers; and receive, from the at least two reference receivers in the first ground subsystem, satellite measurement data and ephemeris data from a second plurality of satellites in view of the first ground subsystem, wherein the first ground site is different from the other ground sites and wherein the second plurality of satellites is a subset of the first plurality of satellites; execute algorithms to: evaluate the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity; determine a current quality metric of the ionosphere based on the evaluation of the satellite measurement data adjust a Vertical Ionosphere Gradient standard deviation sigma-vig ($\sigma_{vig}$) based on the determined quality metric of the ionosphere; evaluate the ephemeris data associated with the second plurality of satellites in view of the first ground subsystem and evaluating the satellite measurement data for the first plurality of satellites in view of the plurality of reference receivers to determine if the GPS corrections provided to the vehicle are degraded by ephemeris errors; and establish ephemeris uncertainty to protect integrity based on the evaluation of the ephemeris data.

Example 2 includes the system of Example 1, wherein the at least one processor is further configured to: determine if the ephemeris uncertainty for one or more of the second plurality of satellites in view of the first ground subsystem exceeds a preselected threshold; and if the ephemeris uncertainty for a satellite in view of the first ground subsystem is less than the preselected threshold, broadcast the adjusted Vertical Ionosphere Gradient standard deviation sigma-vig ($\sigma_{vig}$) and the ephemeris uncertainty data from the first ground subsystem.

Example 3 includes the system of any of Examples 1-2, further comprising: at least one transmitter in the first ground subsystem, wherein the at least one processor is further configured to: determine if the ephemeris uncertainty for one or more of the second plurality of satellites in view of the first ground subsystem exceeds a preselected threshold, and if the ephemeris uncertainty for a satellite in view of the first ground subsystem is less than the preselected threshold, broadcast the adjusted Vertical Ionosphere Gradient standard deviation sigma-vig ($\sigma_{vig}$) and the ephemeris uncertainty data from the at least one transmitter in the first ground subsystem.

Example 4 includes the system of any of Examples 1-3, wherein the at least one processor is further configured to: determine if the ephemeris uncertainty for one or more of the second plurality of satellites in view of the first ground subsystem exceeds a preselected threshold; and if the ephemeris uncertainty for a satellite in view of the first ground subsystem exceeds the preselected threshold, ceasing broadcast, from the first ground subsystem, of the correction data for the effected satellite.

Example 5 includes the system of any of Examples 1-4, further comprising: the plurality of reference receivers positioned at the other ground sites.

Example 6 includes the system of Example 5, wherein the wide area network of reference receivers positioned at other ground sites, includes a wide area network of reference receivers in other ground subsystems positioned at respective other ground sites.

Example 7 includes the system of Example 6, further comprising: at least one processor in the other ground subsystems positioned at respective other ground sites.

Example 8 includes the system of Example 7, wherein the at least one processor in the other ground subsystems positioned at the respective other ground sites is configured to: receive satellite measurement data and ephemeris data from at least two reference receivers in the other ground subsystem in which the respective at least one processor is located, and receive, from the at least two reference receivers in the first ground subsystem, satellite measurement data from the second plurality of satellites in view of the first ground subsystem.

Example 9 includes the system of any of Examples 6-8, wherein the at least two reference receivers in the first ground subsystem include at least one transmitter.

Example 10 includes the system of any of Examples 1-9, further comprising: a receiver in the first ground subsystem to input and compile the satellite measurement data from the plurality of reference receivers for output to the at least one processor.

Example 11 includes the system of any of Examples 1-10, further comprising: a modem in the first ground subsystem to input and compile the satellite measurement data from the plurality of reference receivers for output to the at least one processor.

Example 12 includes a method of mitigating errors in global position system (GPS) corrections and ephemeris uncertainty data broadcast to a vehicle consuming the GPS corrections and the ephemeris uncertainty data, the method comprising: receiving at a first ground subsystem positioned at a first ground site, from a plurality of reference receivers in a wide area network of reference receivers positioned at other ground sites, satellite measurement data for a first plurality of satellites in view of the plurality of reference receivers, wherein the other ground sites are different from the first ground site; receiving, from at least two reference receivers in the first ground subsystem, satellite measurement data and ephemeris data from a second plurality of satellites in view of the first ground subsystem, wherein the second plurality of satellites is a subset of the first plurality of satellites; evaluating the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity; determining a current quality metric of the ionosphere based on the evaluation of the satellite measurement data; adjusting a Vertical Ionosphere Gradient standard deviation sigma-vig ($\sigma_{vig}$) based on the determined quality metric of the ionosphere; evaluating the ephemeris data associated with the second plurality of satellites in view of the first ground subsystem and evaluating the satellite measurement data for the first plurality of satellites in view of the plurality of reference receivers to determine if the GPS corrections provided to the vehicle are degraded by ephemeris errors; and establish ephemeris uncertainty to protect integrity based on the evaluation of the ephemeris data.

Example 13 includes the method of claim 12, further comprising: determining if the ephemeris uncertainty for one or more of the second plurality of satellites in view of the first ground subsystem exceeds a preselected threshold; and if the ephemeris uncertainty for a satellite in view of the first ground subsystem exceeds the preselected threshold, ceasing broadcast, from the first ground subsystem, of the correction data for the effected satellite.

Example 14 includes the method of any of Examples 12-13, further comprising: determining if the ephemeris uncertainty for one or more of the second plurality of satellites in view of the first ground subsystem exceeds a preselected threshold; and if the ephemeris uncertainty for a satellite in view of the first ground subsystem is less than the preselected threshold, broadcasting the adjusted Vertical Ionosphere Gradient standard deviation sigma-vig ($\sigma_{vig}$) and the ephemeris uncertainty from the first ground subsystem.

Example 15 includes the method of any of Examples 12-14, wherein receiving, from the plurality of reference receivers in the wide area network of reference receivers positioned at the other ground sites, satellite measurement data for the first plurality of satellites in view of the plurality of reference receivers comprises: receiving dual-frequency-satellite measurement data for dual-frequency satellites in view of the plurality of reference receivers in the wide area network of reference receivers.

Example 16 includes the method of any of Examples 12-15, wherein receiving, from the plurality of reference receivers in the wide area network of reference receivers positioned at the other ground sites, satellite measurement data for the first plurality of satellites in view of the plurality of reference receivers comprises: receiving single-frequency satellite measurement data for single-frequency satellites in view of the plurality of reference receivers in the wide area network of reference receivers.

Example 17 includes the method of any of Examples 12-16, wherein the wide area network of reference receivers at the other ground sites includes the first ground subsystem, and wherein the plurality of reference receivers in the wide area network of reference receivers are in other ground subsystems, the method further comprising: transmitting the satellite measurement data for the at least two satellites in view of the first ground subsystem at the first ground site to the reference receivers in the wide area network of reference receivers, which are positioned in the other ground sites, are in other ground subsystems.

Example 18 includes the method of any of Examples 12-17, further comprising: broadcasting the Vertical Ionosphere Gradient standard deviation sigma-vig ($\sigma_{vig}$) from the first ground subsystem.

Example 19 includes a ground subsystem to mitigate errors in global position system (GPS) corrections and ephemeris uncertainty data broadcast to a vehicle consuming the GPS corrections and the ephemeris uncertainty data, the system comprising: at least two reference receivers in a first ground subsystem at a first ground site; at least one processor communicatively coupled to the at least two reference receivers, the at least one processor configured to: receive, from a plurality of reference receivers in a wide area network of reference receivers positioned at other ground sites, satellite measurement data for a first plurality of satellites in view of the plurality of reference receivers; receive, from the at least two reference receivers in the first ground subsystem, satellite measurement data and ephemeris data from a second plurality of satellites in view of the first ground subsystem, wherein the first ground site is different from the other ground sites and wherein the second plurality of satellite is a subset of the first plurality of satellites; execute algorithms to: evaluate the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity; determine a current quality metric of the ionosphere based on the evaluation of the satellite measurement data adjust a Vertical Ionosphere Gradient standard deviation sigma-vig ($\sigma_{vig}$) based on the determined quality metric of the ionosphere; evaluate the ephemeris data associated with the second plurality of satellites in view of the first ground subsystem and evaluating the satellite measurement data for the first plurality of satellites in view of the plurality of reference receivers to determine if the GPS corrections provided to the vehicle are degraded by ephemeris errors; and establish ephemeris uncertainty to protect integrity based on the evaluation of the ephemeris data.

Example 20 includes the ground subsystem of Example 19, further comprising: a receiver to input and compile the satellite measurement data from the plurality of reference receivers in a wide area network of reference receivers positioned at other ground sites.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system to mitigate errors in global position system (GPS) corrections and ephemeris uncertainty data broadcast to a vehicle consuming the GPS corrections and the ephemeris uncertainty data, the system comprising:
at least two reference receivers, in a first ground subsystem at a first ground site, configured to receive satellite measurement data and ephemeris uncertainty data from a second plurality of satellites in view of the first ground subsystem;
at least one processor communicatively coupled to the at least two reference receivers, the at least one processor configured to:
receive, from a plurality of reference receivers in a wide area network of reference receivers positioned at other ground sites, satellite measurement data for a first plurality of satellites in view of the plurality of reference receivers; and
receive, from the at least two reference receivers in the first ground subsystem, the satellite measurement data and the ephemeris data, wherein the first ground site is different from the other ground sites and wherein the second plurality of satellites is a subset of the first plurality of satellites;
execute algorithms to:
evaluate the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity;
determine a current quality metric of the ionosphere based on the evaluation of the satellite measurement data
adjust a Vertical Ionosphere Gradient standard deviation sigma-vig ($\sigma_{vig}$) based on the determined quality metric of the ionosphere;
evaluate the ephemeris data associated with the second plurality of satellites in view of the first ground subsystem and evaluate the satellite measurement data for the first plurality of satellites in view of the plurality of reference receivers to determine if the GPS corrections provided to the vehicle are degraded by ephemeris errors; and
establish ephemeris uncertainty to protect integrity based on the evaluation of the ephemeris data.

2. The system of claim 1, wherein the at least one processor is further configured to:
determine if the ephemeris uncertainty for one or more of the second plurality of satellites in view of the first ground subsystem is less than a preselected threshold; and
if the ephemeris uncertainty for a satellite in view of the first ground subsystem is less than the preselected threshold, broadcast the adjusted Vertical Ionosphere Gradient standard deviation sigma-vig ($\sigma_{vig}$) and the ephemeris uncertainty data from the first ground subsystem.

3. The system of claim 1, further comprising:
at least one transmitter in the first ground subsystem, wherein the at least one processor is further configured to:
determine if the ephemeris uncertainty for one or more of the second plurality of satellites in view of the first ground subsystem is less than a preselected threshold, and
if the ephemeris uncertainty for a satellite in view of the first ground subsystem is less than the preselected threshold, broadcast the adjusted Vertical Ionosphere Gradient standard deviation sigma-vig ($\sigma_{vig}$) and the ephemeris uncertainty data from the at least one transmitter in the first ground subsystem.

4. The system of claim 1, wherein the at least one processor is further configured to:
determine if the ephemeris uncertainty for one or more of the second plurality of satellites in view of the first ground subsystem exceeds a preselected threshold; and
if the ephemeris uncertainty for a satellite in view of the first ground subsystem exceeds the preselected threshold, ceasing broadcast, from the first ground subsystem, of the correction data for the effected satellite.

5. The system of claim 1, further comprising:
the plurality of reference receivers positioned at the other ground sites.

6. The system of claim 5, wherein the wide area network of reference receivers positioned at other ground sites, includes a wide area network of reference receivers in other ground subsystems positioned at respective other ground sites.

7. The system of claim 6, further comprising:
at least one processor in the other ground subsystems positioned at respective other ground sites.

8. The system of claim 7, wherein the at least one processor in the other ground subsystems positioned at the respective other ground sites is configured to:
receive satellite measurement data and ephemeris data from at least two reference receivers in the other ground subsystem in which the respective at least one processor is located, and
receive, from the at least two reference receivers in the first ground subsystem, satellite measurement data from the second plurality of satellites in view of the first ground subsystem.

9. The system of claim 6, wherein the at least two reference receivers in the first ground subsystem include at least one transmitter.

10. The system of claim 1, further comprising:
a receiver in the first ground subsystem to input and compile the satellite measurement data from the plurality of reference receivers for output to the at least one processor.

11. The system of claim 1, further comprising:
a modem in the first ground subsystem to input and compile the satellite measurement data from the plurality of reference receivers for output to the at least one processor.

12. A method of mitigating errors in global position system (GPS) corrections and ephemeris uncertainty data broadcast to a vehicle consuming the GPS corrections and the ephemeris uncertainty data, the method comprising;
receiving at a first ground subsystem positioned at a first ground site, from a plurality of reference receivers in a wide area network of reference receivers positioned at other ground sites, satellite measurement data for a first plurality of satellites in view of the plurality of reference receivers, wherein the other ground sites are different from the first ground site;
receiving, from at least two reference receivers in the first ground subsystem, satellite measurement data and ephemeris data from a second plurality of satellites in view of the first ground subsystem, wherein the second plurality of satellites is a subset of the first plurality of satellites;
evaluating the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity;
determining a current quality metric of the ionosphere based on the evaluation of the satellite measurement data;
adjusting a Vertical Ionosphere Gradient standard deviation sigma-vig ($\sigma_{vig}$) based on the determined quality metric of the ionosphere;
evaluating the ephemeris data associated with the second plurality of satellites in view of the first ground subsystem and evaluating the satellite measurement data for the first plurality of satellites in view of the plurality of reference receivers to determine if the GPS corrections provided to the vehicle are degraded by ephemeris errors; and
establish ephemeris uncertainty to protect integrity based on the evaluation of the ephemeris data.

13. The method of claim 12, further comprising:
determining if the ephemeris uncertainty for one or more of the second plurality of satellites in view of the first ground subsystem exceeds a preselected threshold; and
if the ephemeris uncertainty for a satellite in view of the first ground subsystem exceeds the preselected threshold, ceasing broadcast, from the first ground subsystem, of the correction data for the effected satellite.

14. The method of claim 12, further comprising:
determining if the ephemeris uncertainty for one or more of the second plurality of satellites in view of the first ground subsystem is less than a preselected threshold; and
if the ephemeris uncertainty for a satellite in view of the first ground subsystem is less than the preselected threshold, broadcasting the adjusted Vertical Ionosphere Gradient standard deviation sigma-vig ($\sigma_{vig}$) and the ephemeris uncertainty from the first ground subsystem.

15. The method of claim 12, wherein receiving, from the plurality of reference receivers in the wide area network of reference receivers positioned at the other ground sites, satellite measurement data for the first plurality of satellites in view of the plurality of reference receivers comprises:
receiving dual-frequency-satellite measurement data for dual-frequency satellites in view of the plurality of reference receivers in the wide area network of reference receivers.

16. The method of claim 12, wherein receiving, from the plurality of reference receivers in the wide area network of reference receivers positioned at the other ground sites, satellite measurement data for the first plurality of satellites in view of the plurality of reference receivers comprises:
receiving single-frequency satellite measurement data for single-frequency satellites in view of the plurality of reference receivers in the wide area network of reference receivers.

17. The method of claim 12, wherein the wide area network of reference receivers at the other ground sites includes the first ground subsystem, and wherein the plurality of reference receivers in the wide area network of reference receivers are in other ground subsystems, the method further comprising:
transmitting the satellite measurement data for the at least two satellites in view of the first ground subsystem at the first ground site to the reference receivers in the wide area network of reference receivers, which are positioned in the other ground sites, are in other ground subsystems.

18. The method of claim 12, further comprising:
broadcasting the Vertical Ionosphere Gradient standard deviation sigma-vig ($\sigma_{vig}$) from the first ground subsystem.

19. A ground subsystem to mitigate errors in global position system (GPS) corrections and ephemeris uncertainty data broadcast to a vehicle consuming the GPS corrections and the ephemeris uncertainty data, the system comprising:
at least two reference receivers, in a first ground subsystem at a first ground site, configured to receive satellite measurement data and ephemeris uncertainty data from a second plurality of satellites in view of the first ground subsystem;
at least one processor communicatively coupled to the at least two reference receivers, the at least one processor configured to:
receive, from a plurality of reference receivers in a wide area network of reference receivers positioned at other ground sites, satellite measurement data for a first plurality of satellites in view of the plurality of reference receivers;
receive, from the at least two reference receivers in the first ground subsystem, the satellite measurement data and the ephemeris data, wherein the first ground site is different from the other ground sites and wherein the second plurality of satellite is a subset of the first plurality of satellites;
execute algorithms to:
evaluate the satellite measurement data received from the at least two reference receivers in the first ground subsystem and the satellite measurement data received from the plurality of reference receivers in the wide area network of reference receivers to determine if the GPS corrections broadcast to the vehicle are degraded by a current ionosphere disturbance activity;
determine a current quality metric of the ionosphere based on the evaluation of the satellite measurement data
adjust a Vertical Ionosphere Gradient standard deviation sigma-vig ($\sigma_{vig}$) based on the determined quality metric of the ionosphere;
evaluate the ephemeris data associated with the second plurality of satellites in view of the first ground subsystem and evaluate the satellite measurement data for the first plurality of satellites in view of the plurality of reference receivers to determine if the GPS corrections provided to the vehicle are degraded by ephemeris errors; and
establish ephemeris uncertainty to protect integrity based on the evaluation of the ephemeris data.

20. The ground subsystem of claim 19, further comprising:
a receiver to input and compile the satellite measurement data from the plurality of reference receivers in a wide area network of reference receivers positioned at other ground sites.

* * * * *